Figure 1:
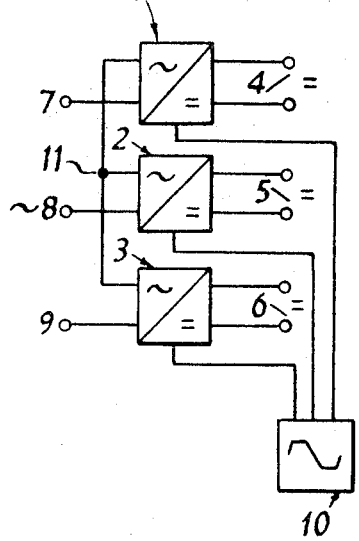

United States Patent [19]
King

[11] 3,839,667
[45] Oct. 1, 1974

[54] INVERTERS

[75] Inventor: Kenneth Gordon King, London, England

[73] Assignee: Westinghouse Brake and Signal Company Limited, London, England

[22] Filed: July 3, 1972

[21] Appl. No.: 268,460

[30] Foreign Application Priority Data
July 23, 1971   Great Britain .................. 34783/71

[52] U.S. Cl. .................. 321/9 R, 317/27 R, 321/11
[51] Int. Cl. .................................. H02m
[58] Field of Search ......... 317/27 R, 41; 321/5, 9 R, 321/27, DIG. 1

[56] References Cited
UNITED STATES PATENTS

| | | | |
|---|---|---|---|
| 3,052,833 | 9/1962 | Collidge et al. ......................... | 321/5 |
| 3,054,939 | 9/1962 | Thompson ....................... | 321/27 R |
| 3,521,143 | 7/1970 | Anderson et al. ..................... | 321/5 |
| 3,681,662 | 8/1972 | Specha ............................. | 317/27 R |

OTHER PUBLICATIONS
Electronic Industries, "Transistorized Three-Phase Power Supplies," pp. 2–5, January 1959.

*Primary Examiner*—William H. Beha, Jr.
*Attorney, Agent, or Firm*—Larson, Taylor & Hinds

[57] ABSTRACT

A polyphase, floating neutral, inverter in which harmonics of the operating frequency are added to the fundamental to increase the line-to-line output voltage for a given input voltage. In the three-phase three-wire case the Triplen harmonics are used. The inverter uses single phase amplifiers and a polyphase drive signal generator. One generator is described in detail. The inverter also includes a rapid acting semiconductor device protection circuit which employs an electrical network analog of the thermal characteristics of the device.

13 Claims, 15 Drawing Figures

3,839,667

INVERTERS

This invention relates to inverters and in particular to an inverter arrangement having a three-wire three-phase alternating current output.

According to the invention there is provided an inverter arrangement including input terminals for the connection of a d.c. source, output terminals for the supply of an $n$-phase, $n$-wire alternating output, a drive signal generator to provide a drive signal including components at the fundamental frequency of said alternating output and odd harmonics thereof whereby each phase output waveform includes harmonic components which in conjunction with the harmonic components of other phase voltages result in a sinusoidal line-to-line waveform of higher value than that formed by the fundamental of each phase voltage.

In an arrangement for a three-phase, three-wire output the odd harmonics may be Triplen harmonics.

The means responsive to the drive signal may be a class B amplifier for each phase of the output. The means responsive to the drive signal may be an electrical power conversion circuit responsive to a control signal having an alternating waveform to produce an output of alternating potential, including means to respond to a zero of the control waveform to interrupt a supply path between the source and one output terminal for an interval when said zero does not coincide with a current zero in said supply path, and means to complete an alternative current path across the output terminals of the circuit for a period between the control signal zero and the current zero, as is described hereinbelow.

An output transformer may be provided for each means responsive to drive signal to isolate the output terminals from said means and to ensure there is no direct current path from any input terminal to any output terminal. The output terminals may be connected to a delta-star transformer so that the star-point of the transformer secondary provides the neutral terminal for a three-phase four-wire a.c. output.

According to the invention there is also provided a semiconductor device protection circuit including means responsive to the instantaneous values of current in and voltage across such a device installed in an inverter to produce a signal representing the instantaneous power dissipation in the device when operated in the linear mode, an electrical network simulating the thermal characteristics of the device and means responsive to the output of said network when supplied with said signal to indicate whether or not an allowable thermal operating condition is exceeded.

The signal representing the instantaneous power may be an approximation derived from the sum of signals proportional to the instantaneous voltage and instantaneous current at the device. The electrical network may be a combination of electrical wave shaping circuit elements simulating the variation of the relative thermal impedance of the device with the variation of the pulse form of a signal applied to the device.

According to the invention there is provided a drive signal generator to produce a drive signal including a component at a fundamental frequency and at the Triplen harmonics thereof for each phase of a three-phase alternating current including, in an oscillatory loop, an integrater for each phase to generate a three-phase four-wire output at the fundamental of the alternating current, means to combine a portion of the peak of each phase waveform as a Triplen harmonic signal to displace the neutral point of said three phase signal. Triplen harmonics are harmonics the order of which is divisible by 3 and may be defined mathematically as $3x$ harmonics where $x$ is a positive integer.

The means to combine said peak waveforms may include unidirectional paths to supply the peak of each phase waveform in turn to a voltage sensitive network which permits only the waveform above a certain selected value to pass to a common load resistor the remote end of which is connected to a reference voltage, whereby a neutral connection to the adjacent end of said load resistor is so displaced. The voltage sensitive network may include a Zener diode to set the selected voltage value. The voltage sensitive network may be a limiter including means to adjust a symmetry of the limiter with respect to the reference voltage.

Figure 1A:
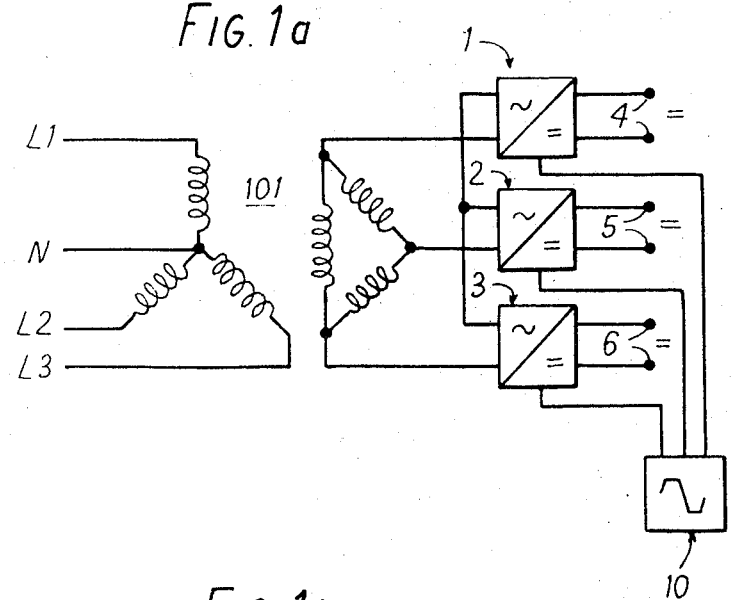
Figure 1B:
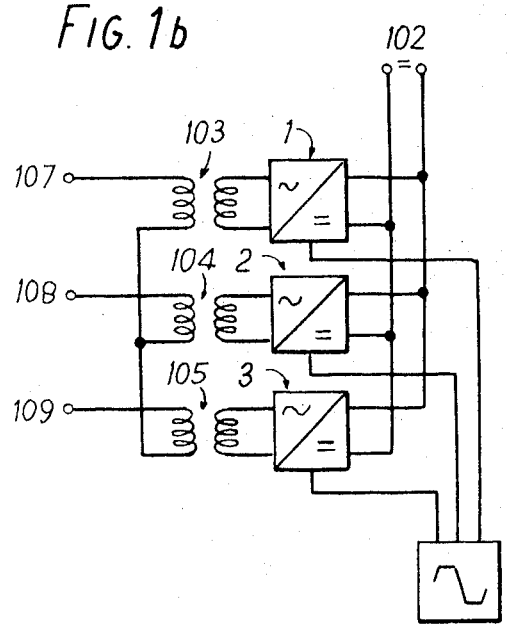

Embodiments of the invention will now be described with reference to the accompanying drawings in which FIG. 1 shows a block schematic circuit diagram of an inverter arrangement, FIGS. 1(a) and 1(b) show alternate embodiments of the inverter arrangement of FIG. 1.

Figure 2:
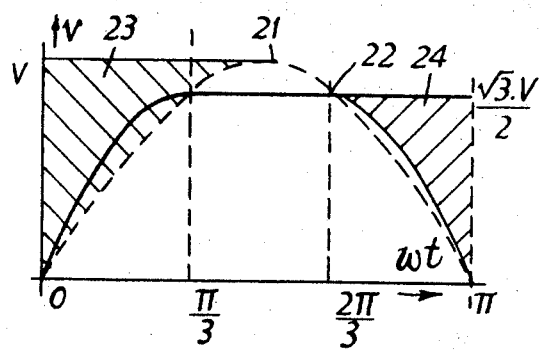
Figure 3:
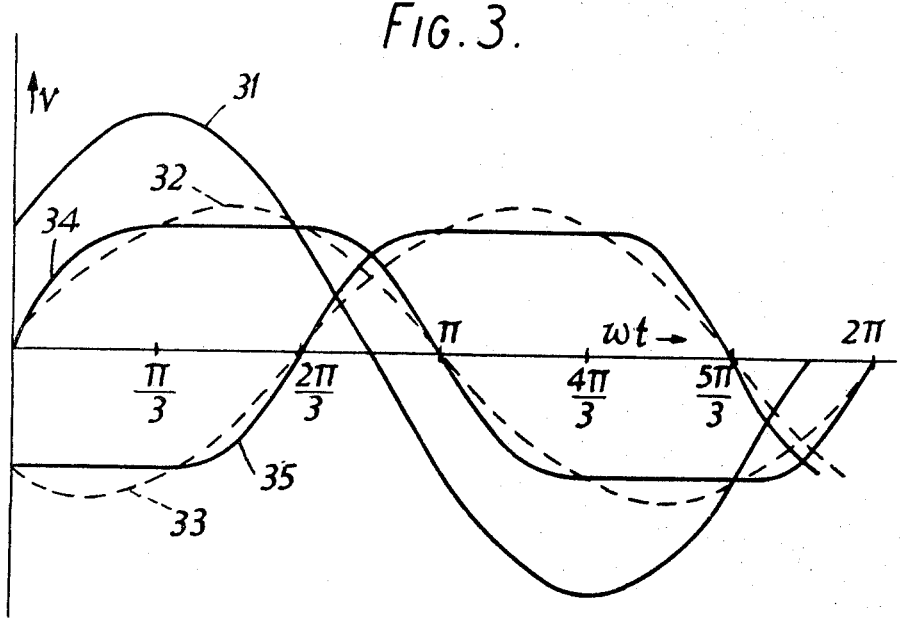
Figure 4:
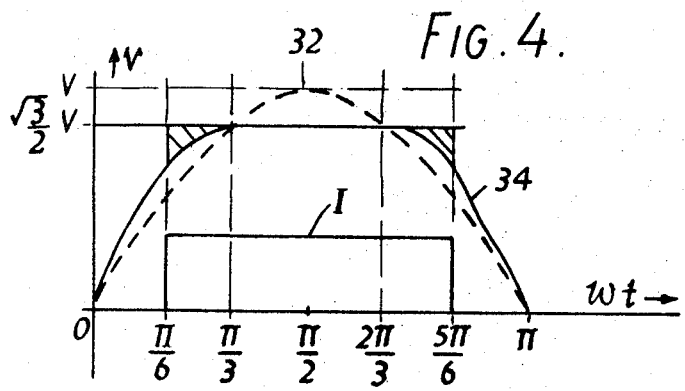
Figure 5:
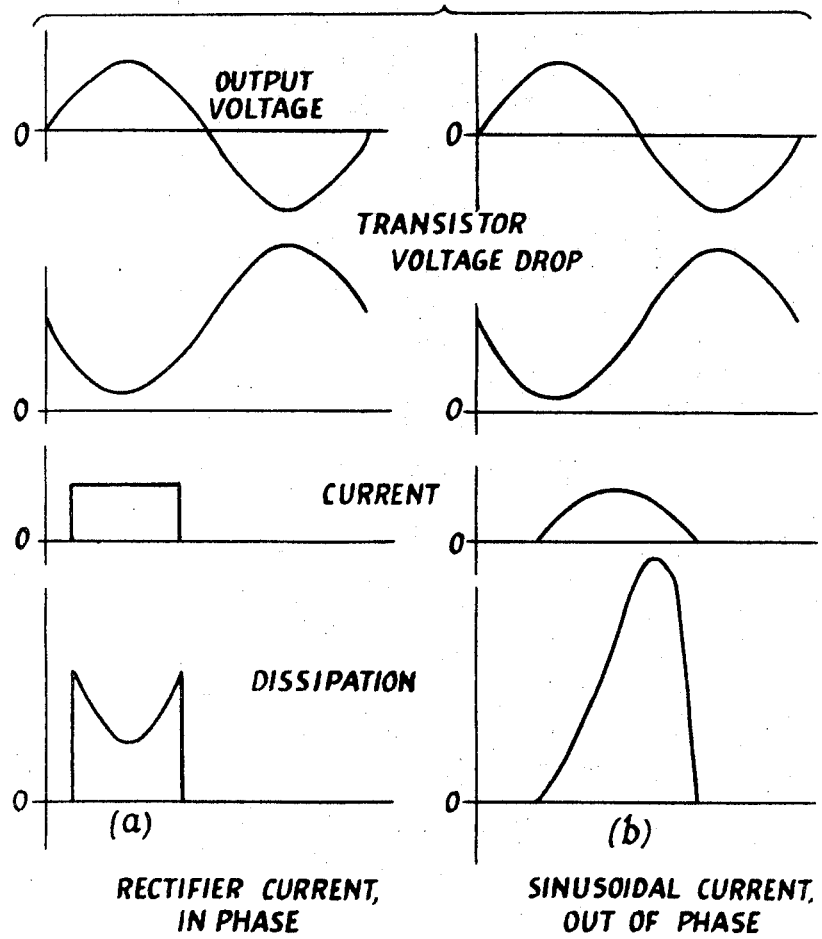
Figure 6:
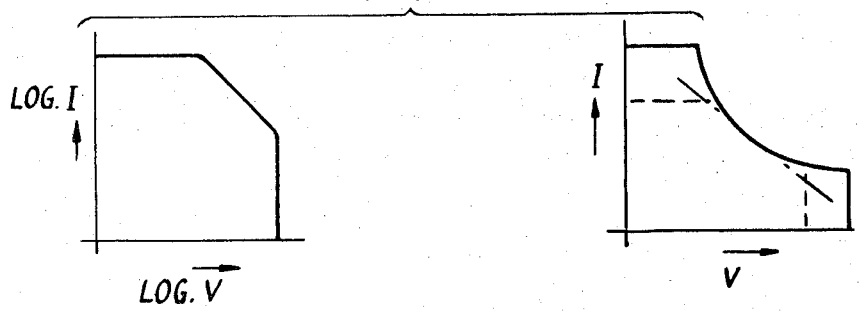
Figure 7:
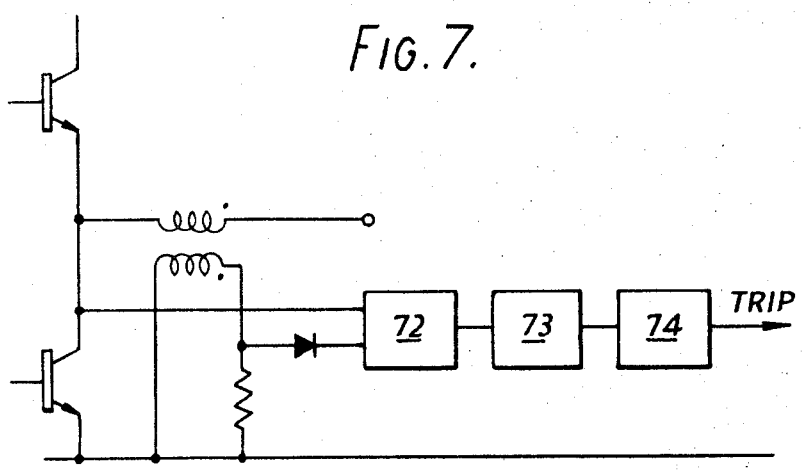
Figure 9:
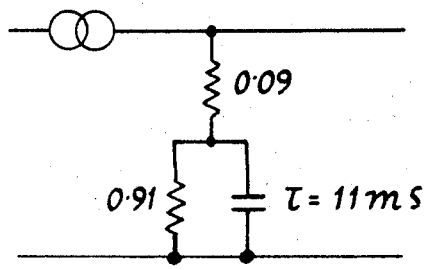
Figure 8:
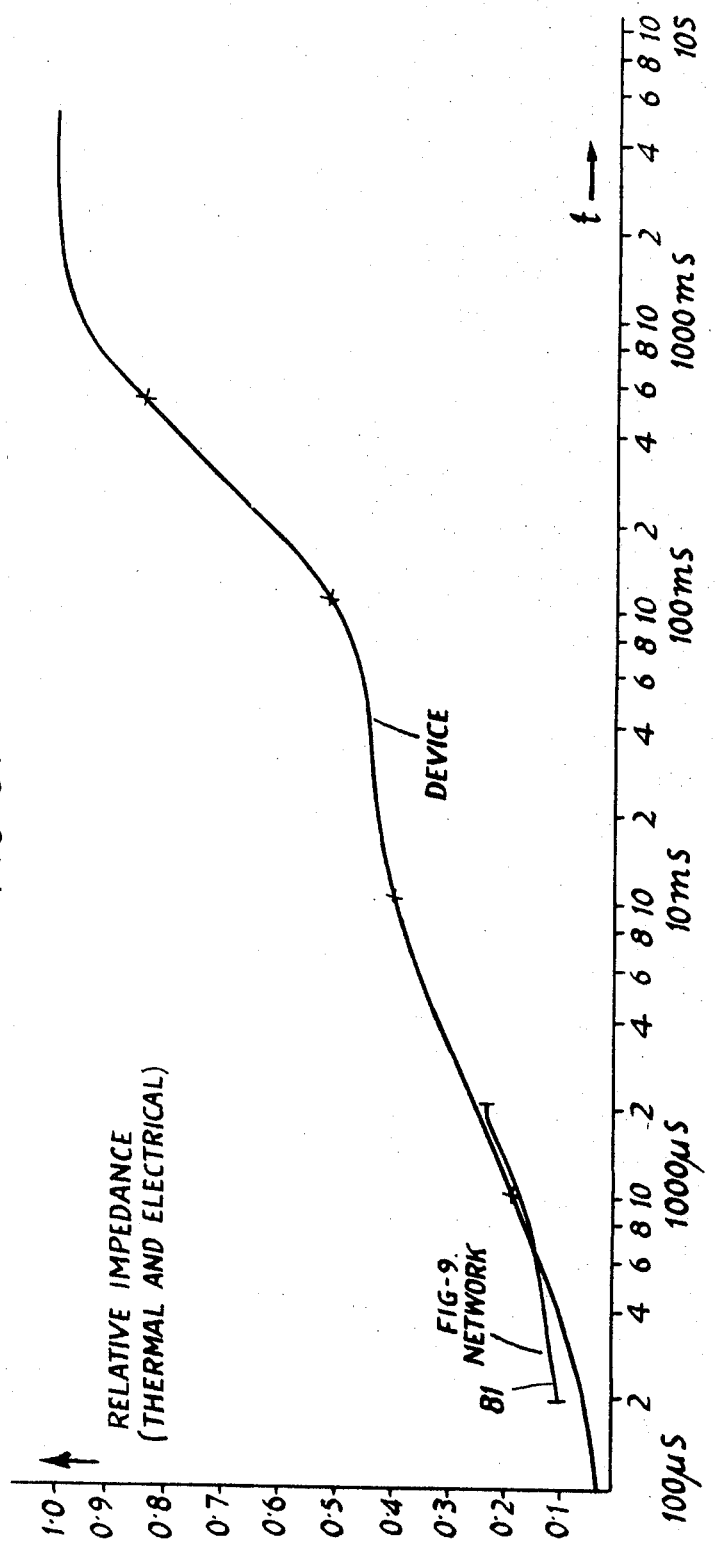
Figure 10:
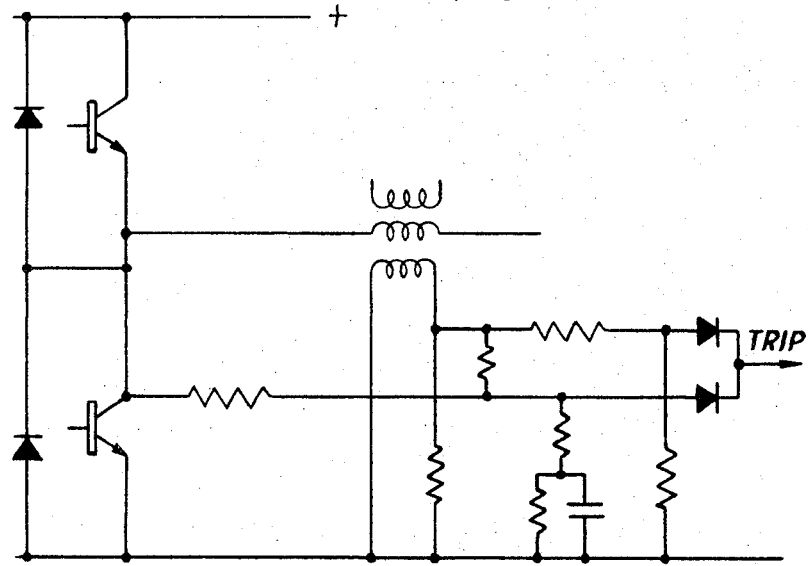
Figure 11:
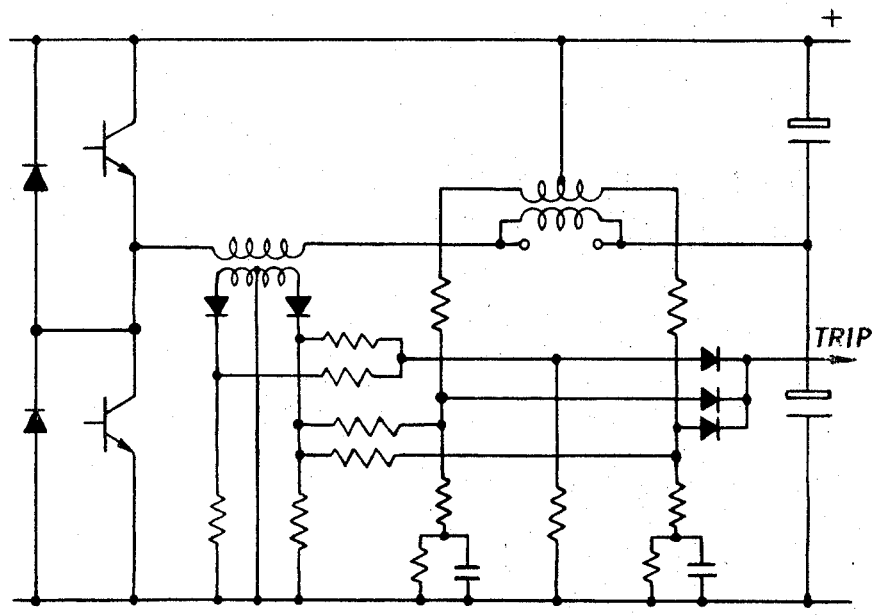
Figure 12:
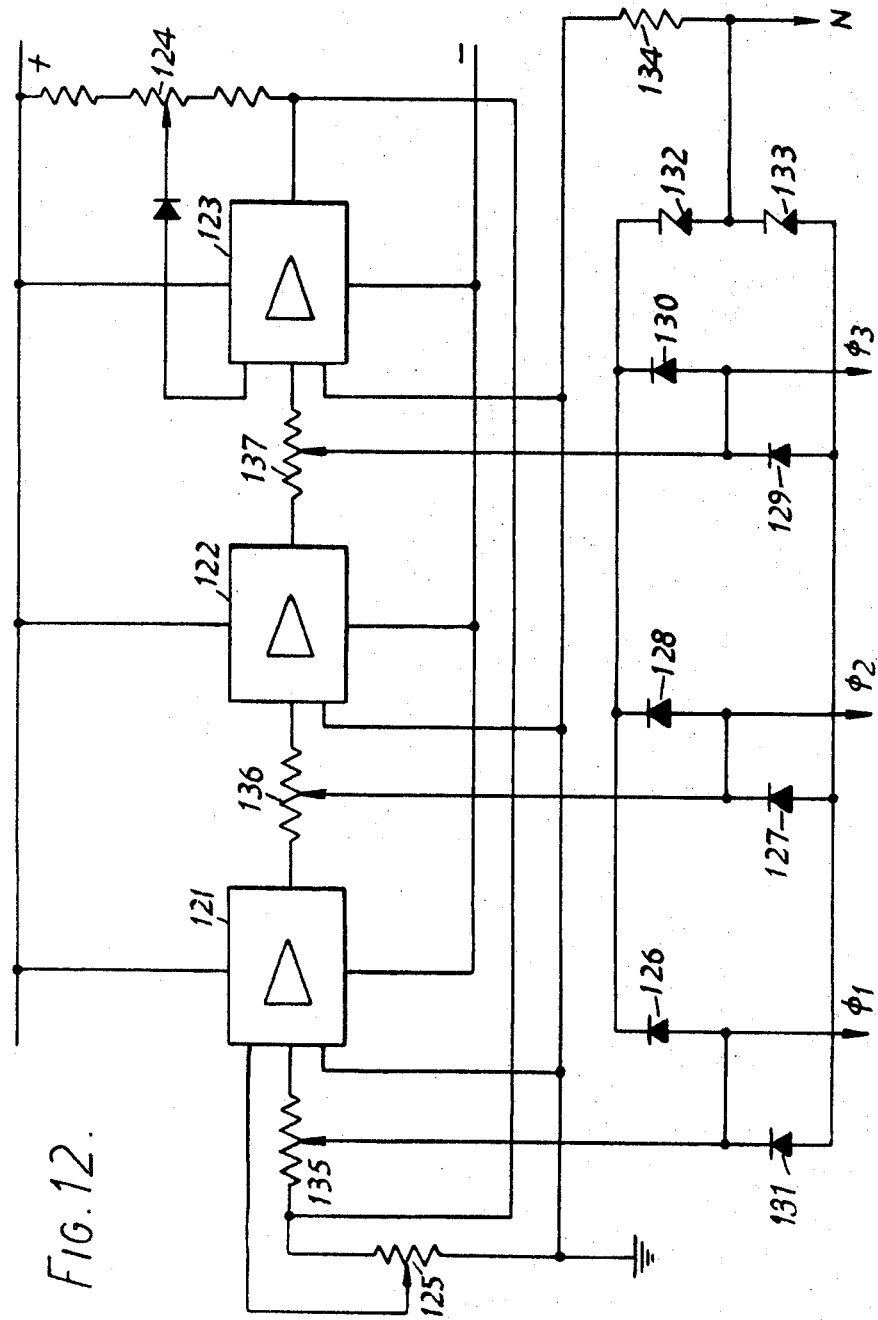
Figure 13:
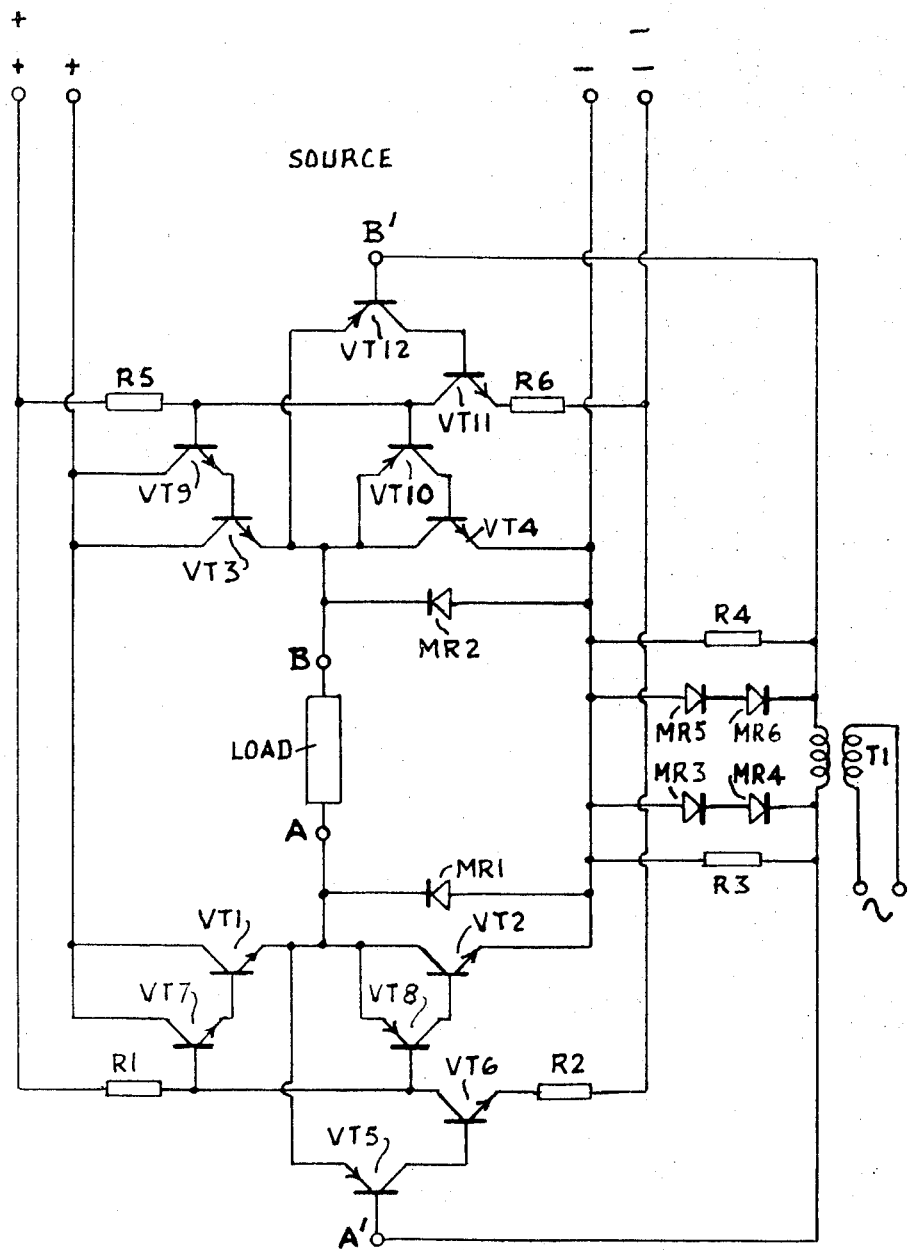

FIGS. 2 and 3 show waveforms useful in understanding the operation of the inverter arrangement in FIG. 1, FIGS. 4 and 5 show waveforms useful in understanding the operation of the invention when embodied in an inverter, FIG. 6 shows graphs of power dissipation in a device, FIG. 7 shows a block schematic circuit diagram, FIG. 8 shows a graph of the transient thermal impedance of a device, FIG. 9 shows an analog network, FIGS. 10, 11 and 12 show circuits embodying the invention, and FIG. 13 is a circuit circuit diagram of practical embodiment of the invention.

FIG. 1 shows three single-phase inverters, 1, 2 and 3, having respective input terminals 4, 5 and 6 for the connection of individual d.c. sources. A source of drive signals for each inverter is shown at 10. The exact form of these drive signals is described below but briefly they are arranged to drive the three single-phase inverters in a three-phase relationship so that when one output terminal on each inverter is connected to a common point 11 the other output terminals 7, 8 and 9 will provide a three-phase three-wire a.c. supply. It is essential in this arrangement that no direct current path exists between any of the output terminals 7, 8 and 9, or terminal 11, and any of the input terminals 4, 5 and 6. To achieve this ether the d.c. sources are separate from each other or each inverter includes an isolating output transformer as described below in connection with FIGS. 1(a) and 1(b).

The drive signal generator 10 is arranged to produce for each phase a component at the fundamental frequency of the alternating current output required, the components being at the correct relative phase angle. In addition the generator provides the Triplen harmonic series, or a part thereof, for each fundamental component. The output of each single-phase inverter will reproduce the complex drive signal, within the limits of the accuracy of the amplifier, using power derived from the d.c. source for that inverter. The peak-to-peak voltage of the output waveform of each inverter is theoretically twice that of the d.c. supply. If the common point 11 was to be connected to a fixed potential, say earth, the waveform on each of the output terminals 7, 8 and 9 would be that of the drive signal with this peak-to-peak value, with respect to the fixed potential. If however the terminal 11 is allowed to float then the Triplen harmonic component in each phase will displace the output waveforms with respect to each other while maintaining their individual peak-to-peak voltages so that the phase voltages at terminals 7, 8 and 9 are increased. The current drawn from a respective source by each inverter for a given phase current will be the same whether or not terminal 11 is connected to the fixed potential so that when terminal 11 is floating the efficiency of power is increased. This increase in efficiency is achieved by improving the form factor of the output waveform of each inverter so that power which would other-wise have been wasted in internal voltage drops when a sinusoidal drive waveform is applied is now usefully employed and supplied to a connected load.

FIGS. 1(a) and 1(b) show modifications of the arrangement of FIG. 1 In FIG. 1(a) a delta-to-star or delta-to-wye output transformer 101 is provided which d.c. isolates the three-phase output terminals L1, L2 and L3 of a three-phase, four-wire a.c. output. As illustrated, the star-point of the transformer secondary provides the neutral terminal for the threephase four-wire output. In FIG. 1(b) individual transformers 103, 104 and 105 are provided to d.c. isolate output terminals 107, 108 and 109, thereby ensuring that there is no direct current path from any input terminal to any output terminal.

FIG. 2 shows the output voltage waveforms at a phase terminal for a given phase voltage and line current when the common terminal, 11, is fixed or floating. Waveform 21 is for a fixed common terminal and a phase voltage V. The shaded area 23 represents the voltage drop in a push-pull class B amplifier during a quarter-cycle. Waveform 22 shows the output voltage for an arrangement embodying the invention and producing the same output power as in the previous case. However the voltage drop shown by the shaded area 24 is clearly less and accordingly the supply voltage can be reduced while still achieving the same line current. The supply voltage can be reduced to (3) V/2 of the previous value, for the same effective line-to-line voltage. The reason for this is shown in FIG. 3. Curve 31 is the line-to-line potential at two of the output terminals 7, 8 and 9. When the inverter is driven by a sinusoidal waveform the peak values of each wave do not occur at the same time. Therefore the line-to-line potential must always be less than twice the maximum excursion during one half-cycle of the waveform at any terminal. This is shown by the two waves 32 and 33. However when driven with the waveform containing Triplen harmonics the output waveforms, 34, 35, at the two output terminals will produce the same line-to-line waveform 31 although the peak value of each waveform is less that that for the half-sine wave 32 or 33. On examining waveforms 34 and 35 it will be seen that their peak values just coincide to produce the peak value of the line-to-line waveform 31. The sinusoidal wave shape is maintained on either side of the peak by the Triplen components present in the drive waveform. These components do not appear in the line-to-line waveform as the three-wire arrangement has a floating neutral and this results in cancellation of the Triplen harmonics which would otherwise be present in the line-to-line waveform. It will be seen that it is thus possible to produce the same output voltage as in the sinusoidal drive case with a reduced d.c. supply voltage to each inverter, which is in itself advantageous, and in addition the energy losses in the inverters are reduced thus reducing the quantity of heat that has to be dissipated from each inverter. The output power will remain the same as the same line current is drawn in each case. The peak value of waveforms 31 in FIG. 3 is (3) V where V is the peak value of a half-sine wave such as 32. As waveforms 34 and 35 contribute equally to the peak value of waveform 31 the peak value of each of these waveforms is (3) V/2. The maximum efficiency of a class B inverter for a resistive load is 78.5 percent on sine-wave drive. As the output power is constant the efficiency with Triplen drive is increased in the inverse ratio of the reduction of the input voltage compared with sine-wave drive. Thus the efficiency is now 78.5 × 2/(3) = 90.7 percent as a theoretical maximum again for a resistive load. The practical efficiency will of course be lower as allowance must be made for the spread of component parameters and voltage variation. However with a reasonable allowance for these the actual efficiency will be at least equal to the maximum theoretical efficiency of a class B inverter with sine-wave drive.

In a preferred application of the invention the load connected to the output terminals is a full wave rectifier with inductive smoothing and connected so that current is drawn for 120° of each half-cycle. FIG. 4 shows the line current and a phase waveform for one half-cycle at one output terminal. As line current is only drawn for 120° of the 180° of a half-cycle in a quasi-square waveform energy lost due to the wave shape only occurs in the inverters for 30° periods on either side of the 60° flat top of the waveform. The losses are thus reduced even further in comparison to the sine wave drive case and the theoretical maximum efficiency is increased to 95.5 percent. This value of efficiency will of course be reduced if a capacitor-input filter is used in the rectifier. A reduction will also occur if a commutating inductance is used in the inverter as this will make the current in the line trapesoidal, increasing the losses for a short period after π/6 and extending the waveform beyond 5π/6 with further losses here. In a practical case the efficiency should be at least as high as with a resistive load, that is approximately 78 percent. This should be compared with the practical case of 67 percent efficiency for a conventional sine wave drive.

It will be seen from the above discussion that the efficiency of the inverter is dependent on the nature of the load it is supplying. If an inverter is designed to operate with a particular type of load then it will only be provided with the appropriate heat dissipation capacity for that load. If the nature of the load is varied or if the operating conditions are otherwise changed to increase the dissipation in the inverter then damage will almost certainly occur.

Protection devices operating in response to the current drawn by the inverter from its supply will not provide protection against this sort of overload as the supply current cannot usually indicate what proportion of the energy supplied is being dissipated in the inverter and what proportion is being applied to the load. Thus in the case described above of a three-phase rectifier with inductive smoothing a short circuit on one phase can cause a displacement of the current wave-form wiht respect to the voltage waveform and the periods of high current flow in the active devices in the inverter will no longer coincide with periods of low voltage drop. Thus the dissipation in a device will be substantially increased even though the current drawn from the source may not change. FIG. 5 shows the effect of this phase displacement.

The dissipation in such a device has two critical parameters. Firstly the average dissipation over a long period of time and secondly the instantaneous dissipation. The instantaneous dissipation is particularly critical if it results in the supply of heat to a part of the device at a higher rate than the thermal conductivity of the device permits the transfer of this heat to a heat sink. Therefore simply measuring the temperature of the heat sink or the average temperature of the device will not give complete protection, while exploiting the full potential of the device.

A conventional way of specifying the safe power dissipation in a device is shown in FIG. 6. A family of curves is plotted for various pulse widths on voltage and current axes extending between the maximum current and voltage ratings shown by the paraxial lines. FIG. 6 also shows one such curve plotted on logarithmic axes to produce a straight line characteristic. The curves in FIG. 6 are based on a parameter of the device called the transient thermal impedance. This is a quantity whose value is dependent on the duration of the pulse applied as well as the power. The instantaneous dissipation must be controlled to avoid "hot-spots" in which heat accumulates more quickly than the thermal conductivity of the device can dissipate it. FIG. 3 shows a graph of this quantity, plotted against pulse duration on a relative basis, for the device identified by the number 2N3773, a transistor.

This characteristic can be represented by an electrical analog network and if signals representing current and voltage in magnitude and duration are applied to the network an output representing the dissipation level in the device will be obtained. FIG. 7 shows an outline of a circuit to do this. Signals representing the instantaneous values of current in and voltage across a device operated in the linear mode, in this case a transistor, are combined in a multiplier 72 to produce a signal representing the instantaneous power in the device and this signal is applied to the analog network 73 which is the electrical model of the thermal characteristics of the device. The output of the analog network is a signal representing the dissipation in the device and this is applied to a level detector 74 which will generate a trip signal or other suitable warning when the dissipation signal from the analog network is excessive.

However the analog network required to model fully the thermal characteristic shown for a device such as a transistor or a thyristor will be extremely complex. If this device is used in say an inverter working at say 400 Hz it is likely to be exposed only to significant pulses having a duration between 0.2ms and 2.0ms. Over this range it is possible to produce an electrical network having a response approximately equivalent to the relative thermal impedance characteristic using the circuit elements of a step and one time-constant. Curve 81 in FIG. 8 shows the electrical characteristic of such a circuit which circuit is itself shown in FIG. 9. If a closer match to the thermal impedance characteristic is required a further time-constant element may be added at the short-time end of the range. However the error in the characteristic shown errs on a side of safety.

The power dissipation in a device usually needs further restriction at the extremes of current and voltage and this is shown by the dotted paraxial lines in FIG. 6. Between these limits a straight line is a close approximation to the rectangular hyperbola representing constant power and furthermore the approximation is on the safe side. Thus instead of having to express power as a product of voltage and current it can be expressed as the sum of voltage and current and a sufficiently good approximation to the instantaneous power dissipation can be obtained by adding signals proportional to the voltage and current. FIG. 10 shows a circuit of the type shown in FIG. 7 simplified by making the approximations described above. A separate circuit would have to be used for the transistors connected to the positive and negative supplies but in, for example, a multi-phase inverter all the transistors on one supply line could be connected to a common level detector. FIG. 11 shows an arrangent in which, by means of transformer coupling, all protection circuits are operated at the same potential and only one level detector is required. Individual adding circuits are of course still required as the instantaneous companents for each device must be considered separately.

The application of the output of the level detector to protect the circuit will be readily apparent to those skilled in the art. If required the threshhold level of the level detector may be linked with ambient temperature or the temperature of the heat sinks of the devices. In this way full advantage can be taken of any incease in dissipation capability at low temperatures.

FIG. 12 shows a block schematic diagram of a drive signal generator suitable for use as described above. The generator includes three integrating stages, one for each phase, each including an operational amplifier. A sutiable operational amplifier has been found to be that available from Fairchild Inc. under the reference A709C. An oscillatory loop is formed from the three integrating stages, 121, 122 and 123, in series. The output of each stage forms one of the three phases of the fundamental component of the alternating current drive signal. The loop is provided with amplitude limiting and loop gain controls 124 and 125 respectively and these controls, together with the balance controls provided by the adjustable tapping points on resistors 135, 136 and 137 for the phase outputs, permit the adjustment of the loop to produce the three-phase sinusoidal output waveforms required. The sinusoidal output waveforms are then applied to a wave-shaping circuit in which the Triplen harmonic components are generated. This circuit includes for each phase a pair of oppositely poled diodes (126 to 131) the diodes of each polarity being connected to a common point. Each common point is connected through an individual Zener diode, 132 or 133 and a common load resistor 134 to the neutral point of the oscillator three-phase output. The Zener voltage of the Zener diodes 132 and 133 is so chosen that on the appropriate one of the diodes 126 and 131 conducting on the occurrence of a peak of one phase of the sinusoidal waveform the Zener diode conducts to clip the peak of this waveform and to generate with it a voltage across the common load resistor 134. By appropriate choice of the Zener voltage having regard to the peak value of the sinusoidal waveform a voltage across the common load resistor measured at the point N will be the required Triplen harmonic component. This Triplen component which displaces the neutral point will therefore also displace the respective phase voltage in the same manner and the clipped sinusoid will be augmented by the Triplen components to produce the required drive waveform. In one oscillator constructed in the manner described above the sinusoidal output waveform had a peak line voltage of 16 volts and each of the Zener diodes 132, 133 has a nominal voltage of 8.2 volts to produce the required Triplen harmonic component.

It is essential that the Zener diodes are accurately matched as on this matching depends the correct formation of the Triplen component. An alternative arrangement which avoids some of the problems of matching uses a pair of transistors opposite conductivity type, one in place of each Zener diode. The two bases of the pair of transistors are connected to a balance circuit which may be another transistor driven from a potential divider energised by an emitter follower, so that the Triplen harmonic components can be accurately balanced.

Other forms of drive signal generator in which a Triplen harmonic component can be produced would of course be equally suitable for use with the invention.

Reference is now made to FIG. 13 which shows a practical arrangement embodying the invention. The four arms of the bridge are formed by pairs of transistors connected as compound emitter followers the pairs being respectively VT1 and VT7, VT2 and VT8, VT3 and VT9, VT4 and VT10. Two adjacent pairs are grouped and each group is biassed and driven through two transistors and two resistors VT5, VT6, R1, R2 and VT11, VT12, R5, R6, respectively. Diodes MR1, MR2 are connected as collector-emitter shunts for transistors VT2 and VT4, respectively. Load connection terminals A' and B' are the bases of transistors VT5 and VT12, respectively. A sinusoidal driving signal applied to the terminals of the primary of transformer T1 will pass from the secondary to the drive terminals A', B'. Diodes MR3–MR6 ensure that terminals A' and B' are respectively driven slightly negative with respect to the appropriate output terminal to ensure that VT1 and VT3, respectively, are properly cut off as appropriate. The source for the output power is connected to terminals +, − while terminals ++, −− are connected to a supply of slightly higher voltage to ensure that adequate base current drive is available for each pair of transistors in the bridge arms. Each group of transistor pairs and its associated drive transistors operates in a similar manner to well-known audio amplifier circuits under the control of the drive voltage applied to transformer T1 to produce a sinusoidal output voltage at terminals A and B in accordance with the alternate sinusoidal half cycles applied to drive terminals A' and B'. These half cycles provide a slightly negative potential during their "off" times which is applied to the bases of VT5 and VT12 respectively to ensure complete cut off of VT1 and VT3. At each zero crossing of the drive voltage the respective one of transistors VT1 and VT3 is driven from the conducting to the non-conducting state but if the load is reactive, then, as shown in FIG. 2, the appropriate diode MR1 or MR2 becomes conductive and together with the saturated one of transistors VT2 or VT4 prevents the appropriate output terminal changing it voltage to permit the appropriate one of transistors VT1 or VT3 to be biassed into the conducting state through the respective biassed transistor. Further as soon as the output current in the closed dissipation loop falls to zero the saturated transistor can be rendered non-conductive, the other saturable transistor rendered conductive and the respective one of transistors VT1 and VT3 also rendered conductive. The circuit arrangement just described will therefore produce sinusoidal output current and waveforms when supplied with the sinusoidal primary drive voltage as discussed above. There will be slight steps in the waveforms at $\phi$ degrees after each voltage zero as the voltage-drops in parts of the circuit change with the redistribution of the supply from the source to the load. In this circuit transistors VT2 and VT4 are arranged to be saturated when the transistors VT1 and VT3, respectively, control the shape of the half cycle waveform for each polarity. Some of the reactive energy in the load is of course dissipated in the dissipation loop during the interval of $\phi°$ after each voltage zero but this energy is only a small proportion of the total and has little effect on the overall efficiency of the arrangement.

Having thus described our invention what we claim is:

1. An inverter arrangement comprising inverter means including input terminals for connection to a d.c. source, and output terminals, for supplying a three-wire, three-phase sinusoidal alternating current output, and a drive signal generator for generating a drive signal for said inverter means which includes the fundamental frequency of said alternating current output and $3x$ harmonics thereof, where $x$ is a positive integer; said inverter means including means responsive to said drive signal for amplifying said signal waveform to the amplitude of the d.c. source so that each phase output waveform includes harmonic components which in conjunction with the harmonic components of the other phase voltages provide a sinusoidal line-to-line waveform of higher value than that formed by the fundamental of each phase voltage.

2. An arrangement as claimed in claim 1 in which the means responsive to the drive signal comprises an electrical power conversion circuit responsive to a control signal having an alternating waveform to produce an output of alternating potential from a source of unidirectional potential, said conversion circuit including means responsive to a zero of the control waveform for interrupting a supply path between the said source and one output terminal for an interval when said zero does not coincide with a current zero in said supply path, and means for completing an alternative current path across the output terminals of the circuit for a period between the control signal zero and the current zero.

3. An arrangement as claimed in claim 1 wherein said drive signal generator includes, in an oscillatory loop, an integrator for each phase for generating a three-phase four-wire output at the fundamental of the alternating current together with means for combining a portion of the peak of each phase waveform as a $3x$ harmonic signal to displace the neutral point of said three-phase signal.

4. A generator as claimed in claim 3 in which the means for combining said peak waveforms includes a voltage sensitive network, a common load resistor connected at the remote end to a reference voltage and at the adjacent end to a neutral connection, and unidirectional paths for supplying the peak of each phase waveform, in turn, to said voltage sensitive network to permit only the waveform above a selected value to pass to said common load resistor whereby the neutral connection to the adjacent end of said load resistor is so displaced.

5. A generator as claimed in claim 4 in which the voltage sensitive network includes a Zener diode for setting the selected voltage value.

6. A generator as claimed in claim 4 in which the voltage sensitive network comprising a limiter including means to adjust the symmetry of the limiter with respect to the reference voltage.

7. An inverter arrangement as claimed in claim 1 and including a protection circuit for a semi-conductor device in the inverter means including means responsive to the instantaneous values of current in and voltage across the device to produce a signal representing the instantaneous power dissipation in the device when operated in the linear mode, an electrical network for simulating the thermal characteristics of the device over a range of time intervals and means responsive to the output of said network when supplied with said signal for indicating whether or not an allowable thermal operating condition is exceeded.

8. An inverter arrnagement as claimed in claim 7 in which said means for producing the signal representing the instantaneous power compirses means for approximating this signal based on the sum of signals proportional to the instantaneous voltage and instantaneous current at the device.

9. An inverter arrangement as claimed in claim 7 in which the electrical network comprises a combination of electrical wave-shaping circuit elements for simulating the variation of the relative thermal impedance of the device with the variation of the pulse form of a signal applied to the device.

10. An inverter arrangement as claimed in claim 9 in which the electrical network includes the circuit elements of a step and a time-constant.

11. An arrangement as claimed in claim 1 in which the means responsive to the drive signal comprises a class B amplifier for each phase of the output.

12. An arrangement as claimed in 1 including an output transformer for each means responsive to the drive signal to isolate the output terminals from said means and to ensure that there is no direct current path from any input terminal to any output terminal.

13. An arrangement as claimed in claim 1 in which the output terminals are connected to a delta-star transformer so that the star-point of the transformer secondary provides the neutral terminal for a three-phase four-wire a.c. output.

* * * * *